169-46 SR
2/17/87 OR 4,643,260

United States Patent [19]

Miller

[11] Patent Number: 4,643,260

[45] Date of Patent: Feb. 17, 1987

[54] FIRE SUPPRESSION SYSTEM WITH CONTROLLED SECONDARY EXTINGUISHANT DISCHARGE

[75] Inventor: Ralph G. Miller, Seattle, Wash.

[73] Assignee: The Boeing Company, Seattle, Wash.

[21] Appl. No.: 781,919

[22] Filed: Sep. 26, 1985

[51] Int. Cl.[4] ........................ A62C 35/12; A62C 3/00; B64D 45/00

[52] U.S. Cl. ........................................ 169/46; 169/62; 169/68; 244/129.2

[58] Field of Search .................. 169/5, 16, 62, 66, 68, 169/70, 61; 244/129.2

[56] References Cited

U.S. PATENT DOCUMENTS

| | | | |
|---|---|---|---|
| 2,566,235 | 8/1951 | Mathisen | 169/2 |
| 2,601,900 | 7/1952 | Rand et al. | 169/19 |
| 2,990,886 | 7/1961 | Dean | 169/6 |
| 3,524,506 | 8/1970 | Weise | 169/2 |
| 3,642,071 | 2/1972 | Utesch, Jr. | 169/2 |
| 3,783,946 | 1/1974 | Petrinec et al. | 169/2 |
| 3,917,001 | 11/1975 | Davis et al. | 169/61 |
| 4,101,887 | 7/1978 | Osborne | 340/652 |
| 4,194,571 | 3/1980 | Monte | 169/61 |
| 4,263,971 | 4/1981 | Spector et al. | 169/61 |

*Primary Examiner*—Joseph F. Peters, Jr.
*Assistant Examiner*—Patrick N. Burkhart
*Attorney, Agent, or Firm*—Eugene O. Heberer

[57] ABSTRACT

A fire extinguishing system including a first rapid discharging Halon bottle (I) and a second metered discharging Halon bottle (II), and the method for providing a violent boil-off when the Halon is discharged from liquid nozzles (60) connected to the second bottle (II) to provide for a thorough and rapid mix of the gas within the compartment.

30 Claims, 8 Drawing Figures

Fig. 4
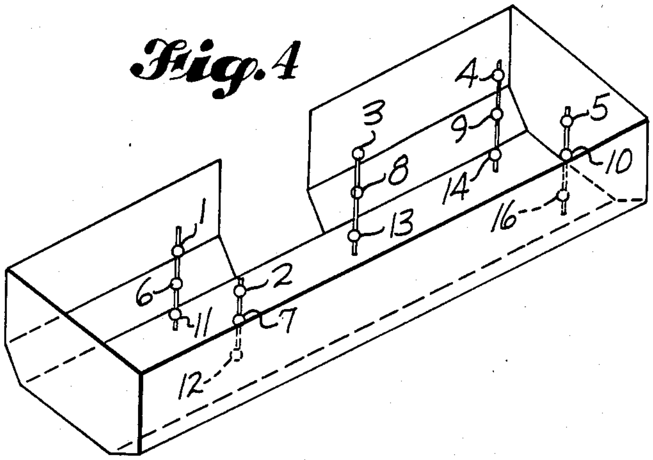
Fig. 5
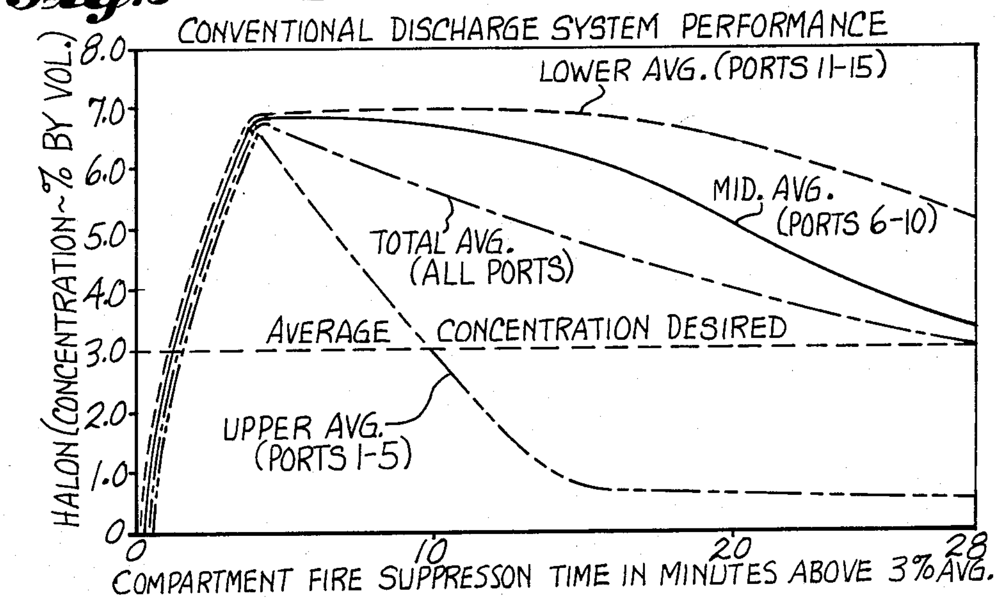
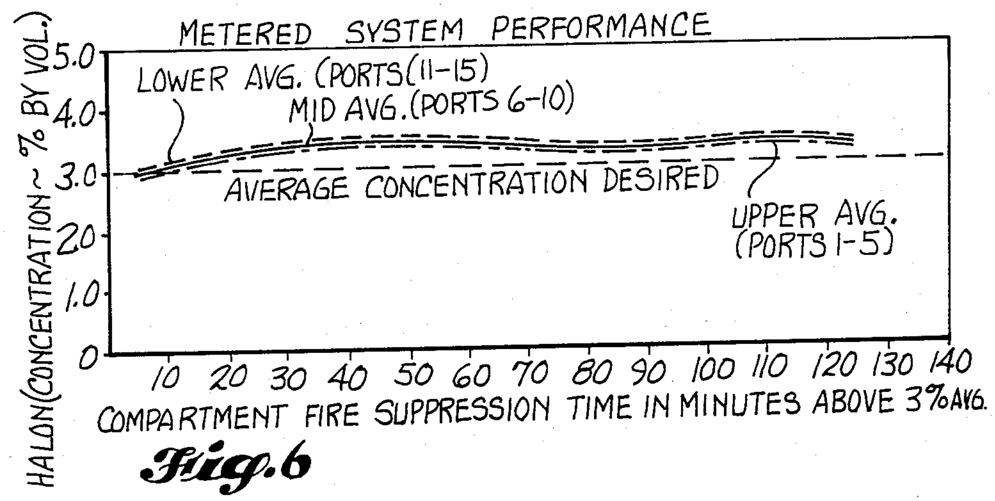
Fig. 6

FIRE SUPPRESSION SYSTEM WITH CONTROLLED SECONDARY EXTINGUISHANT DISCHARGE

TECHNICAL FIELD

The invention relates to fire extinguishers for aircraft cargo compartments and the like.

BACKGROUND ART

Current commercial jetliners with cargo compartments have built-in fire extinguishers and use bromotrifluoromethane as the extinguishant. It is sold commercially as Halon 1301. The current systems typically consist of a minimum of two separate Halon bottles, each with its own discharge mechanism. In the event of a cargo fire, fire suppression is achieved by rapid discharge of a first bottle to ensure a minimum compartment Halon concentration of 5% by volume for initial flame knockdown. Effective fire suppression against deep-seated fire continues as long as the Halon concentration remains above 3% by volume. In order to extend a desired fire suppression time, the second Halon bottle is timed to be discharged when the compartment Halon concentration decreases to 3%. This sequence of discharge can be performed for any number of Halon bottles to achieve any desired duration of fire suppression.

This method cannot optimize Halon utilization when long suppression times are required because leakage at high initial Halon concentration is characteristic after each subsequent bottle discharge.

A search of the patent literature discloses a number of fire extinguishing systems. For example, U.S. Pat. No. 3,783,946 uses an extinguishant open or shut control valve 20 and has wide open discharges 18 of the same size as the flow lines 16. This system permits a transient phase change of the extinguishant from liquid to gas unpredictably somewhere in the line distribution network, depending on the environment temperature to which the system is exposed. The result is an unsteady-state flow which cannot be accurately controlled as the extinguishant is changed into a gas phase. The gas thus is introduced at very low flows into the compartment and sinks locally to the bottom of the compartment because it is five times heavier than air. As a result, the mixing of the extinguishant in the compartment is likely to be incomplete and the fire suppression is not likely to be as effective as it should be.

The following patents disclose other fire extinguishing systems of general interest: U.S. Pat. No. 2,566,235, issued Aug. 28, 1951 to A. Mathisen; U.S. Pat. No. 2,601,900, issued July 1, 1951 to C. H. Rand et al.; U.S. Pat. No. 2,990,886, issued July 4, 1961 to G. A. Dean; U.S. Pat. No. 3,524,506, issued Aug. 18, 1970 to C. A. Weise; U.S. Pat. No. 3,642,071, issued Feb. 15, 1972 to Utesch, Jr.; U.S. Pat. No. 3,917,001, issued Nov. 4, 1975 to Davis et al; U.S. Pat. No. 4,101,887, issued July 18, 1978 to Osborne; U.S. Pat. No. 4,194,571, issued Mar. 25, 1980 to Monte; and U.S. Pat. No. 4,263,971, issued Apr. 28, 1981 to Spector et al.

DISCLOSURE OF THE INVENTION

The invention is a fire extinguishing system and method for aircraft cargo compartments and the like. The system includes a first bottle containing an extinguishant such as bromotrifluoromethane, being nitrogen superpressurized to about 360 P.S.I.A. at 70° F. There is a first extinguishant discharge line connected to the first bottle and extending into a compartment for the fire extinguishant discharge. Rapid discharge nozzles are connected to the first line and are positioned in the compartment for rapid discharge of the extinguishant from the first bottle to ensure a minimum concentration in the compartment of about 5% volume for an initial flame knockdown of a fire in the compartment.

A second bottle containing bromotrifluoromethane, nitrogen superpressurized (as required) to about 360 P.S.I.A. at 70° F., has a second bleed discharge line and extends into the compartment. The bleed line has a small diameter such as 0.25 inch, substantially smaller than the first line. Small diameter liquid discharge nozzles are connected to the second line and positioned in the compartment to discharge the extinguishant from the second bottle.

There are means between the second bottle and small discharge nozzles and within the small discharge nozzles for maintaining the extinguishant in liquid form and low pressure loss in the line, to prevent freeze-up, to provide flow accuracy maintenance, and to provide a violent boil-off when discharged from the small nozzles to provide for a thorough and rapid mix of the gas within the compartment to ensure a 3% by volume extinguishant concentration for a predetermined time in the compartment to adequately control or extinguish a fire in the compartment. These means between include a regulator in the second line between the second bottle and the small discharge nozzles, the regulator regulating flow pressure and temperature in the second line; insulation around the second line between the regulator and the small nozzles to aid in maintaining the extinguishant in liquid form; small nozzles that are series flow devices to allow relatively large flow passages with high pressure losses to minimize any possibility of plugging by fluid impurities during discharge; and a molecular sieve filter/dryer in the second line between the second bottle and the regulator to trap particles introduced into the second line during squib ignition, which opens the bottles to the line, and to adsorb water from the extinguishant to prevent nozzle plugging by freeze-up.

The bottles have normally closed connections to the lines and there are squib means associated with the bottles and lines to open the connections to the lines. The squib associated with the second bottle is operable to open the connection at a predetermined time relative to the discharge from the first bottle to maintain the 3% by volume concentration in the compartment.

The method includes rapidly releasing and spreading a gas extinguishant into a compartment in an amount sufficient for an initial flame knockdown of a fire in the compartment. Then, at a predetermined time, which is determined by experiment or calculations for the compartment, there is a releasing and spreding of more of the gas extinguishant from a second container. The extinguishant is maintained in liquid form, preventing pressure loss, in a discharge bleed line and nozzles, including preventing freeze-up and providing flow accuracy and maintenance in the line and nozzles, and providing a violent boil-off when discharged from the small liquid nozzles to provide a thorough and rapid mix of the gas within the compartment. The Halon liquid is released and spread from the second bottle at a predetermined rate to ensure a predetermined gas extinguishant concentration for a predetermined time in the compartment to adequately control or extinguish a fire in the compartment.

The invention provides an efficient utilization of make-up Halon from a second bottle by using a new metering method, according to the invention, where Halon from a properly sized second bottle is introduced into the compartment at a rate equal to the amount lost through compartment leakage. This rate and the time of flow must be determined from the individual compartment. The maintenance of Halon at a constant 3% by volume optimizes Halon utilization over the desired period of fire suppression with a resultant system weight reduction. The first bottle is not available for metered flow because rapid Halon discharge is required for the flame knockdown.

The proposed system has been carefully created to use a number of commercially available key components in a unique manner to deal with the sensitive thermophysical properties of Halon when operated in the environments of airplane cargo compartments.

It is an important concept of the invention to transport the extinguishant, as it is metered from the second bottle, wholly in its liquid phase until its introduction into the cargo compartment. According to the invention, this provides an efficient transport, low pressure loss in the line, no phase change, resulting in flow reliability, no freeze-up and flow accuracy maintenance; and of particular importance, the invention produces a violent boil-off at the point of extinguishant expulsion into the compartment. The Halon boiling point is −72° F. It is this explosive extinguishant introduction from the small liquid carrying nozzles that is essential for a thorough and rapid mix within the compartment, a prerequisite of effective fire suppression.

The new system, according to the invention, when introduced into new airplanes or integrated into existing airplane fire cargo suppression systems, will not affect current airplane fire fighting procedures nor crew operations. Thus, contemporary flight deck layouts may remain unchanged; only the mechanical aspect of the fire extinguishing system is affected.

Further advantages of the invention may be brought out in the following part of the specification wherein samll details have been described for the competence of disclosure, without intending to limit the scope of the invention which is set forth in the appended claims.

BRIEF DESCRIPTION OF THE DRAWINGS

Referring to the accompanying drawings which are for illustrative purposes:

FIG. 4 is a view of a aircraft compartment illustrating positions of collection ports in a compartment and by which the gas is collected to determine the percentage volume of the extinguishant in the various positions;

FIG. 5 is a graph illustrating the percentages of the extinguishant in the collection ports shown in FIG. 4 for a conventional discharge system, the percentages being plotted against time;

FIG. 6 is a graph of the type shown in FIG. 5 for the metered system, according to the invention, and illustrating the concentration as found in the collection ports in FIG. 4;

BEST MODE FOR CARRYING OUT THE INVENTION

Figure 1:
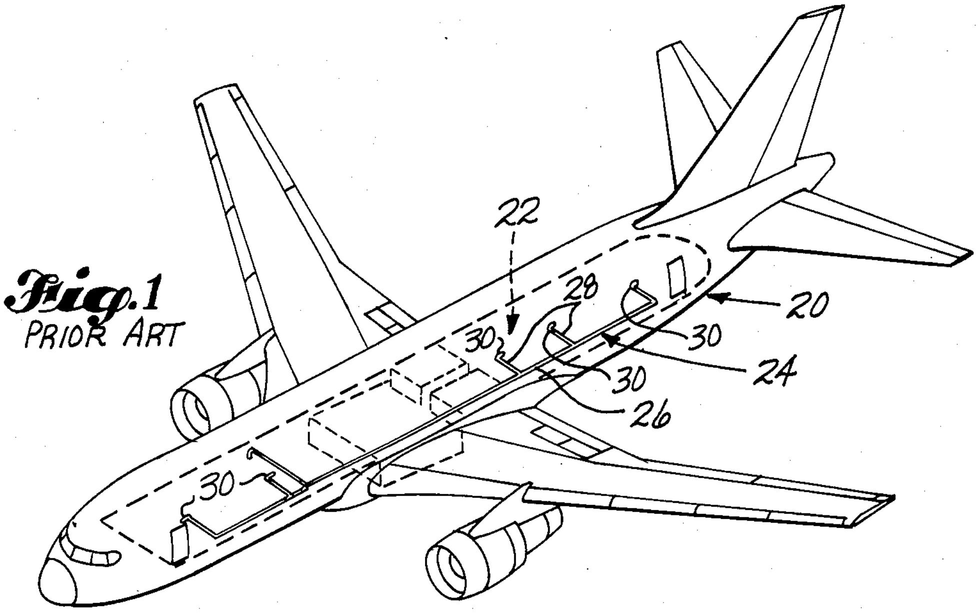
Fig. 1 PRIOR ART
FIG. 1 is a pictorial view of a cargo aircraft in which a fire extinguishing system is shown generally as it may have been installed in the prior art.

Referring again to the drawings, there is shown in FIG. 1 an aircraft, generally designated as 20, having a cargo compartment 22 in which there is a prior art fire extinguishing system 24. The system 24 is only generally shown illustrating a main extinguishant flow line 26, distributing lines 28, and discharge nozzles 30. A more recent system has two such lines supplied by bottles, not shown, containing an extinguishant such as Halon. In such a system, first one bottle is discharged and when the concentration of the Halon gas is about to be lowered to a 3% by volume average in the compartment during a fire, the second bottle is discharged. This type of system does not optimize halon utilization when long suppression times are desired because leakage at high initial halon concentration is characteristic after each subsequent bottle discharge.

Figure 2:
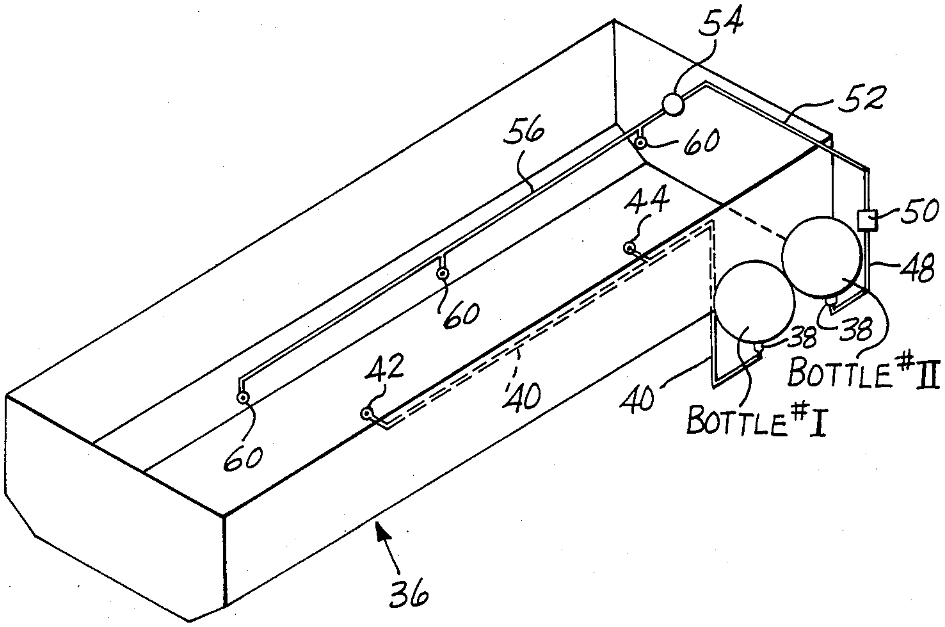
FIG. 2 is a pictorial view of an aircraft compartment, illustrating the schematic positioning of the extinguishing system according to the invention.
Figure 3:
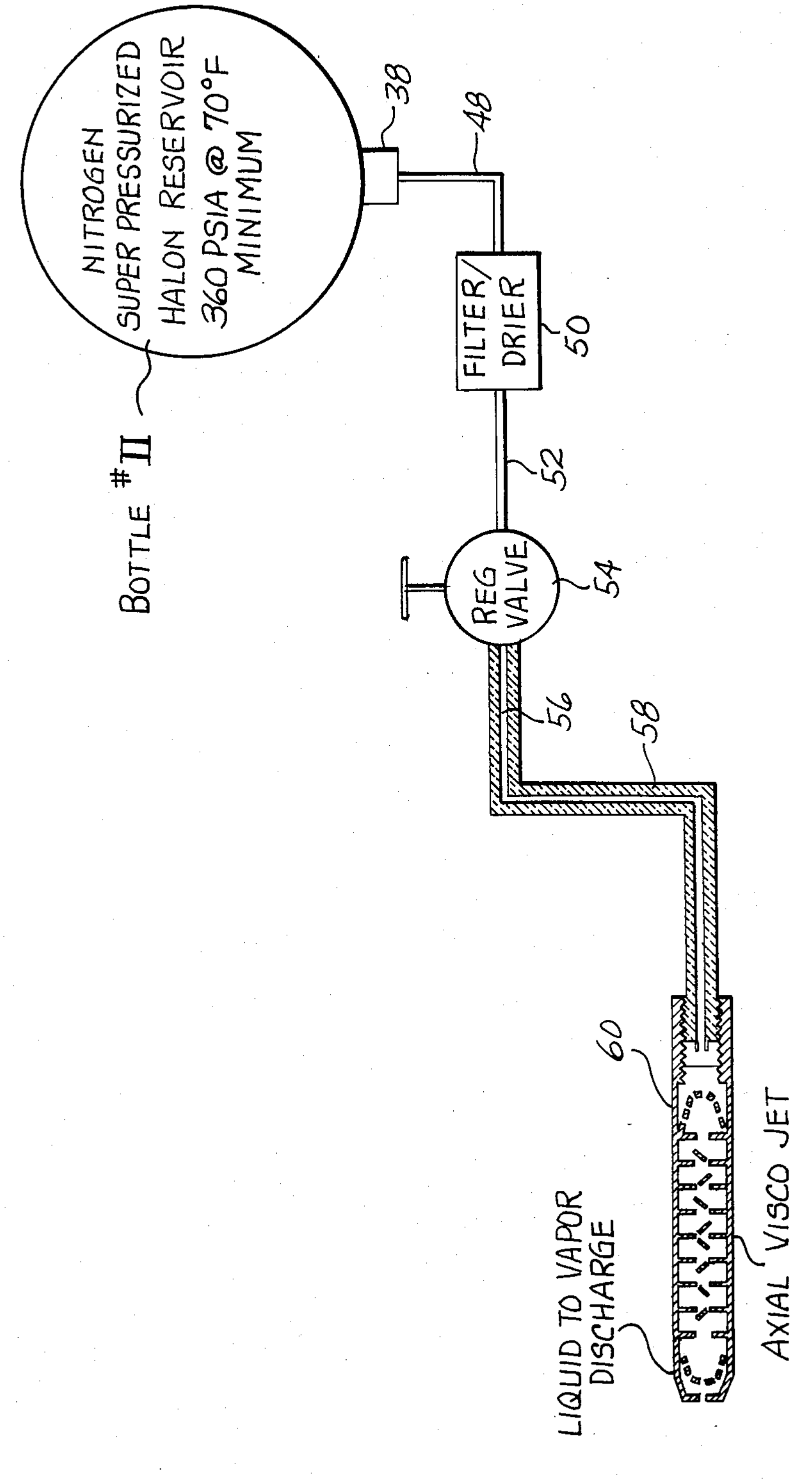
FIG. 3 is a schematic view of a second bottle of an extinguishant connected to a metering system for transporting the extinguishant in liquid form from the bottle to the compartment where it is discharged in a violent boil-off as a gas.

The invention is shown in FIGS. 2 and 3, as designed for a particular large cargo carrying airplane. FIG. 2 shows an outline of a cargo compartment, generally designated as 36. There is a first bottle number I with a discharge connection 38 connected to a distribution line 40 which generally extends along the ceiling of the compartment and has a series of discharge openings as 42 and 44. This system is the same as has been used in the prior art to rapidly discharge Halon into the compartment to ensure a minimum compartment Halon concentration of 5% by volume for an initial flame knockdown. Halon in the bottle is nitrogen superpressurized, normally having a pressure of 360 P.S.I.A. at 70° F. Superpressurization is used to provide for a quick Halon discharge and to allow incorporation of efficient means of leak detection. In the system shown bottle number I contains 55 lbs. of Halon and has a volumetric capacity of 1400 cubic inches. Nozzles 42 and 44 are large and the line 40 has a $\frac{3}{4}$ inch flow diameter. Connection 38 is sealed with a disc between the bottle and the line 40 and has a squib therein which is electrically fired, by means not shown, to open the connection by metering the disc to allow the dumping of the Halon from bottle number I into the compartment.

A system containing bottle number II is novel and has a connection 38 of the same type as bottle number I. For the aircraft incorporating the system the bottle number II contains 33 lbs. of Halon and has a capacity of 800 cubic inches. Connection 38 on bottle number II also has a squib, electrically fired to open a disc in the connection to allow the flow of the Halon into discharge line 48 which is a bleed line having a diameter of one quarter inch.

Line 48 has a filter/dryer 50 which may be typically of the Catch-All brand. The filter/dryer is a molecular sieve to trap small particles introduced during the squib discharge and to adsorb the small amounts of water content found in the commercial grade of Halon. The elimination of water from the Halon prior to nozzle discharge is essential to prevent nozzle plugging by water freeze-up.

The bleed or second line 48 continues as line 52 downstream of the filter/dryer and has a regulating valve or regulator 54 therein. The desired discharge flow rate is controlled by the regulator 54 and it controls both downstream fluid pressure and temperature. The regulator used is a Tescom brand 44-2200 series hand loader pressure reducing valve. The flow line is continued downstream of the regulator valve as 56 and is insulated to aid in maintaining the Halon in liquid form. The insulation 58 terminates in each of a series of spaced small liquid discharge nozzles 60 which are typically recessed in the center line of a cargo compartment ceiling liner.

The discharge nozzles 60 are typical Lee brand axial visco jet nozzles and have a discharge diameter of about 0.035 inch. The nozzles 60 are series flow devices having relatively large flow passages and provide high pressure losses. This arrangement minimizes any possibility of plugging by fluid impurities during discharge.

In this system the Halon, having a boiling point of −72° F., is maintained in liquid form until it is discharged as a gas at the end of the nozzle 60. This system, which starts with bottle number II and terminates in the nozzles 60, maintains a liquid phase transport throughout. This provides for sufficient transport and flow reliability and flow accuracy maintenance. It also produces a violent boil-off at the point of Halon expulsion. It is this explosive Halon introduction from the nozzles that is essential for thorough and rapid mix within the compartment, which is a prerequisite for effective fire suppression. When the liquid passes through the regulator 54, the pressure is dropped to 200 P.S.I.A. and the temperature drops to 40° F. The system shown is for use in a compartment having a length of about 40 feet.

The first bottle opened by the ignition of the squib in the connection 38 insures a minimum compartment concentration of 5% by volume for an initial flame knockdown. To maintain an effective fire suppression against a deep-seated fire the Halon concentration must remain at 3%. The second bottle is timed to be discharged when the Halon concentration from the first bottle drops to 3% by leakage. The number of bottles required depends upon the compartment size and it has been found, under the old system using three bottles, a 3% Halon concentration can be maintained for about 90 minutes and with the present invention using the same three bottles, a 3% concentration of Halon provides effective fire suppression for 157 minutes. With the new system the concentration is uniform at all times during that period. The flow rate through the gas discharge nozzles 60 is in the range of 0.6 to 0.7 lbs./min, but may be in the range of 0.2 to 1.5 lbs./min.

FIGS. 4–8 illustrate test results for the conventional discharge system performance and for the metered system performance shown in FIGS. 2 and 3. In FIG. 4 there is a schematic view of a compartment 66 having collection ports at three different levels in the compartment. The Halon gas is collected at the various levels to determine the average concentrations. As may be seen the upper ports are numbered 1–5; the middle ports are numbered 6–10, and the lower ports, near the bottom of the compartment, are numbered 11–15.

In FIG. 5 a conventional discharge system performance is graphically illustrated by plotting Halon concentration percentage by volume from one bottle against time in minutes in a compartment as shown in FIG. 2. The total average for all ports indicates an initial high average of about 6.7% and a drop to a 3% average after 28 minutes. In the upper ports 1–5 the concentration drops to less than 1% after 15 minutes. Similarly, the concentration for the middle ports 6–10 dropped to almost 3% after 28 minutes, and the lower ports 11–15 have a concentration of about 5.5% after 28 minutes.

In FIG. 6 the metered system performance, according to the invention, is shown. After using only one bottle of Halon, the average concentrations at all ports remain above 3% for about 125 minutes and there is little disparity between the upper ports 1–5, the middle ports 6–10, and the lower ports 11–15.

Because the present inventive system introduces Halon near the ceiling at a controlled rate, the characteristic Halon stratification problem present in the prior art is eliminated. This is a major improvement in that uniform fire suppression is now possible throughout the protected compartment as shown in FIG. 6. It also indicates that there need not be concern as to the potential origin of a compartment fire. In other words, the concentration is maintained throughout the compartment and the location of the fire is not material.

Figure 7:
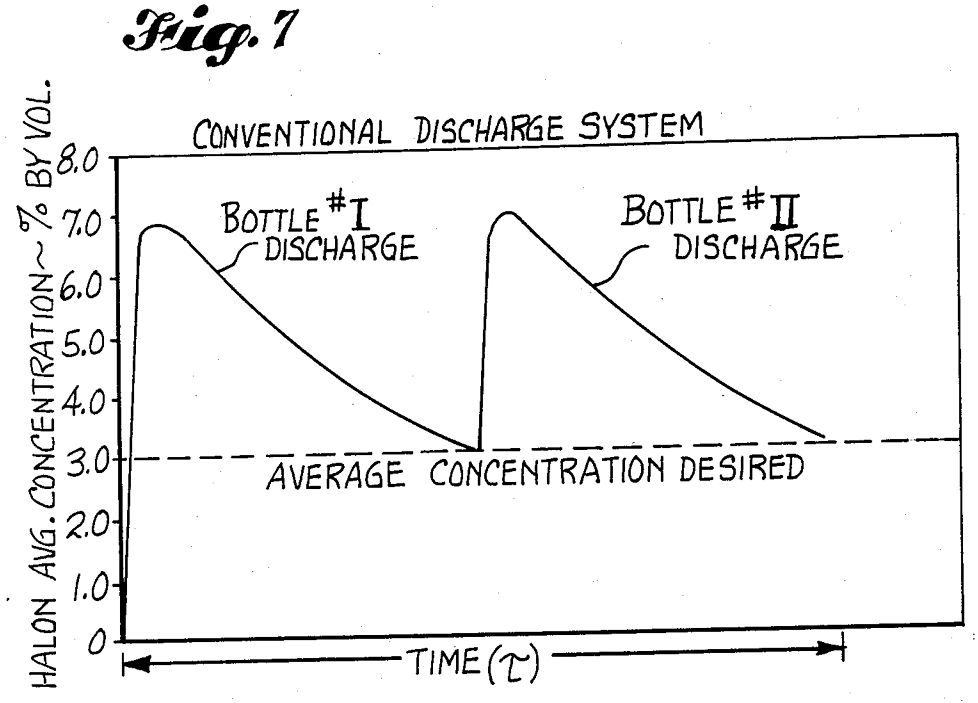
FIG. 7 is a graph illustrating average Halon concentration plotted against time according to a conventional discharge system using two bottles.

FIG. 7 illustrates the actual results from first and second bottle discharges in the conventional discharge system for a period of time during which the second bottle discharge concentration drops to 3%. As is shown initially when bottle number I is discharged the average concentration rises to 6.7% or more and then drops to 3% at which time the second bottle is discharged. Then the average concentration drops to three percent in the same manner but in a little longer time than the first bottle.

Figure 8:
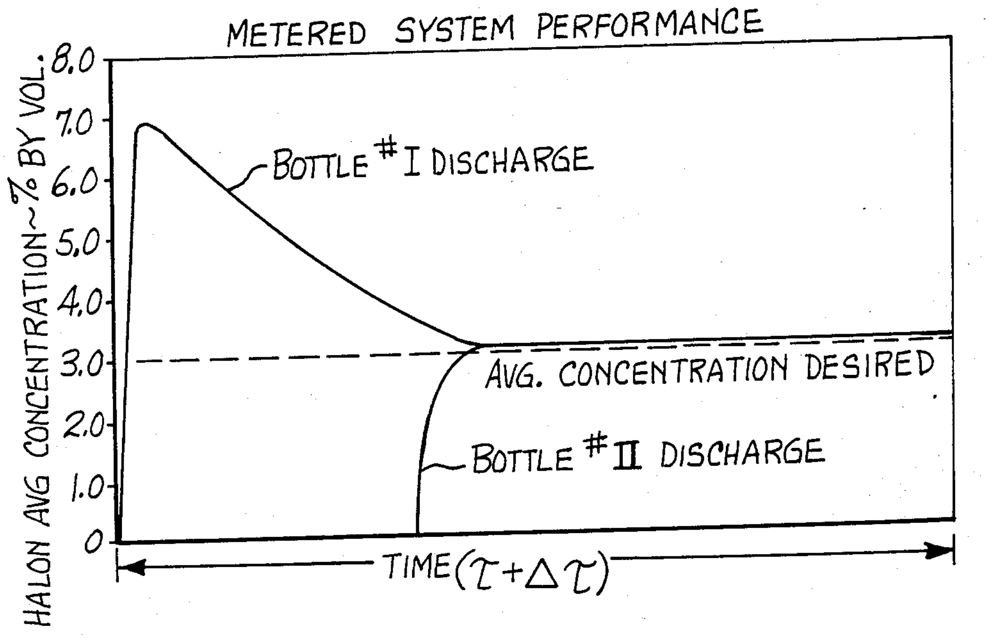
FIG. 8 is a graph similar to that in FIG. 7, illustrating the average concentration of the extinguishant plotted against time for the metered system performance, according to the invention.

In FIG. 8 the total metered system performance according to the invention, is shown. The first bottle produces an average concentration of approximately 6.7% when first discharged and the concentration then tends to drop to 3%. Prior to this time which must be known from calculation or experiment for a particular compartment, the second bottle is discharged and the average concentration is maintained above 3% as indicated in FIG. 6. Here, the time is shown as indicated in FIG. 7 but there is an additional delta time shown because the 3% average concentration lasts for a longer period of time as indicated in FIG. 6. The first bottle discharge concentration decrease remains the same in the conventional and metered system but the second bottle in the metered discharge clearly exhibits an exercise in optimization for maintaining the desired average concentration of 3% or more.

In operation, the Halon is independently plumbed from bottles I and II to one or more cargo compartments and is discharged from the bottles by electrically fired pyrotechnic charges (squibs) which rupture metal discs in the connections 38 and thus in distributed through the lines, first through the first line 40, and then second line 48, 52, 56. The flight deck fire extinguishing system is located in a console. The fire extinguishing panel contains four switch assemblies. One switch arms the proper set of squibs that connect the fire extinguishing bottles to the discharge lines. There is one discharge switch for each of the fire extinguisher bottles.

When smoke is detected in a cargo compartment, the squibs are armed by pushing an appropriate squib arm switch. This action arms both extinguisher bottle discharge switches and illuminates the word "ARMED" on the switch light. In addition, this shuts off the air conditioning recirculation fans and heating air to the affected compartment. The switch for bottle I is then pushed to fire its squib and allow the Halon to be rapidly discharged into the cargo compartment. This provides the 5% Halon concentration sufficient to knockdown open flames and extinguish any surface fires. The 5% charge initiates a controlled atmosphere of Halon for a period of time which is called the "soak time." An average concentration of 3% is more than sufficient to reduce a deep-seated fire to a controlled state of smoldering. The initial Halon concentration decays with time due to compartment air leakage. This requires the firing of the second bottle and the time duration between actuation of the first and second bottles is determined by flight tests. The second charge is designed to maintain at least an average of 3% concentration for the duration of the flight to a suitable landing site, if the fire is not completely extinguished.

Because gaseous Halon has very little heat absorbing ability, minutes to hours, depending upon Halon concentration, are required for complete fire extinguishment of deep-seated fires when relying on natural convection and conduction for heat dissipation. Results of tests indicate that if a 3% Halon concentration can be maintained for a sufficient soak time the flame is reduced to a smoldering fire and the compartment oxygen concentration will be reduced below 15% at which point the fire will not rekindle. This will also hold the temperatures low enough to avoid possible structural damage.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. A fire extinguishing system for aircraft cargo compartments and the like, comprising:

a first bottle containing an extinguishant under substantial pressure in liquid form;

a first extinguishant discharge line connected to the first bottle and extending into a compartment in which a fire is to be extinguished;

rapid discharge first nozzles connected to the first line and positioned in the compartment for rapid discharge of the extinguishant from the first bottle to ensure a sufficient gas extinguishant average concentration in the compartment for an initial flame knockdown of a fire in the compartment;

a second bottle containing the extinguishant under substantial pressure in liquid form;

a second extinguishant discharge bleed and metering line connected to the second bottle and extending into the compartment;

said second line having a small diameter relative to said first line;

small liquid second discharge nozzles connected to the second line and positioned in the compartment to discharge the extinguishant from the second bottle;

means between the second bottle and liquid discharge second nozzles and within the liquid discharge nozzles for maintaining the extinguishant in wholly liquid form with no phase change and avoiding significant pressure loss in the second line, to prevent freeze-up, to provide controlled rate flow accuracy maintenance to introduce the extinguishant into the compartment at a rate at least equal to the amount lost through compartment leakage, and to provide a violent boil-off when discharged from the second nozzles to provide for a thorough and rapid mix of gas within the compartment to ensure a predetermined average extinguishant concentration for a predetermined time in the compartment to adequately control or extinguish a fire in the compartment;

the bottles having normally closed connections to the lines; and means associated with the bottles and lines to open the connections to the lines;

said means associated with the second bottle being operable to open the connection at a predetermined time relative to the discharge from the first bottle to establish said predetermined concentration in the compartment.

2. The invention according to claim 1 in which:

the extinguishant average concentration from the first bottle for the initial flame knockdown is about 5% by volume of the compartment.

3. The invention according to claim 1 in which:

the extinguishant average concentration from the second bottle to adequately control or extinguish the fire is about 3% by volume of the compartment.

4. The invention according to claim 1 in which:

the means associated with the bottles to open the connections to the lines are electrically ignitable squibs.

5. The invention according to claim 1 in which:

said means associated with the second bottle being operated to open the connection to maintain an extinguishant average concentration of about 3% by volume in the compartment.

6. The invention according to claim 1 in which:

said means between include a regulator in the second line between the second bottle and the second discharge nozzles, the regulator regulating the flow pressure and temperature in the second line.

7. The invention according to claim 1, in which:

said means between include insulation around the second line between the regulator and the gas nozzles to aid in maintaining the extinguishant in liquid form.

8. The invention according to claim 1 in which:

the flow rate of the extinguishant through the second nozzles is in the range of 0.6 to 0.7 lbs./min.

9. The invention according to claim 1 in which:

the extinguishant in both bottles is liquid bromotrifluoromethane under a pressure of about 360 P.S.I.A. at 70° F.

10. The invention according to claim 1 in which:

said means between include second nozzles that are series flow devices to allow relatively large flow passages with high pressure losses to minimize any possibility of plugging by fluid impurities during discharge.

11. The invention according to claim 4 in which:

said means between include a molecular sieve filter/dryer in the second line between the second bottle and the regulator to trap particles introduced into the second line during the squib ignition and to adsorb water from the extinguishant to prevent nozzle plugging by freeze-up.

12. A fire extinguishing system for aircraft cargo compartments and the like, comprising:
a first bottle containing bromotrifluoromethane as an extinguishant and being nitrogen superpressurized to about 360 P.S.I.A. at 70° F.;
a first extinguishant discharge line connected to the first bottle and extending into a compartment for the fire extinguishant discharge;
rapid discharge nozzles connected to the first line and positioned in the compartment for rapid discharge of the extinguishant from the first bottle to ensure a minimum average concentration in the compartment of about 5% by volume for an initial flame knockdown of a fire in the compartment;
a second bottle containing the bromotrifluoromethane extinguishant and being nitrogen superpressurized to about 360 P.S.I.A. at 70° F.;
a second extinguishant bleed and metering discharge line connected to the second bottle and extending into the compartment;
said second line having a small diameter relative to the first line;
liquid discharge second nozzles connected to the second line and positioned near the ceiling in the compartment to discharge the extinguishant from the second bottle;
means between the second bottle and second discharge nozzles and within the second discharge nozzles for maintaining the extinguishant in wholly liquid form with no phase change, preventing significant pressure loss in the second line, to prevent freeze-up, to provide controlled rate flow accuracy maintenance, and to provide a violent boil-off when discharged from the gas within the compartment to ensure a 3% by volume average extinguishant concentration for a prdetermined time in the compartment to adequately control or extinguish a fire in the compartment;
the bottles having normally closed connections to the lines; and
means associated with the bottles and lines to open the connections to the lines;
said means associated with the second bottle being operable to open the connection at a predetermined time relative to the discharge from the first bottle to maintain the 3% by volume concentration in the compartment.

13. The invention according to claim 12 in which:
the means in the bottles to open the connections to the lines are electrically ignitable squibs.

14. The invention according claim 13 in which: said means between include a regulator in the second line between the second bottle and the second discharge nozzles, the regulator regulating the flow pressure and temperature in the second line.

15. The invention according to claim 14 in which:
the flow rate of the extinguishant through the regulated nozzles is in the range of 0.6 to 0.7 lbs./min.

16. The invention according to claim 12 in which:
the first line has a diameter of about ¾" and the second line has a diameter of about 0.25".

17. The invention according to claim 15 in which:

said means between include a molecular sieve filter/dryer in the second line between the second bottle and the regulator to trap particles introduced into the second line during the squib ignition and to adsorb water from the extinguishant to prevent nozzle plugging by freeze-up.

18. The invention according to claim 12 in which:
said means between include second nozzles that are series flow devices to allow relatively large flow passages with high pressure losses to minimize any possibility of plugging by fluid impurities during discharge.

19. A method of extinguishing or controlling a fire in an aircraft cargo compartment or the like, comprising:
rapidly releasing and spreading a gas extinguishant into a compartment in an amount sufficient for an initial flame knockdown of a fire in the compartment;
the extinguishant being under substantial pressure in a first container so as to be in liquid form before being released;
at a predetermined time releasing and spreading more of the extinguishant into the compartment from a second container in which the extinguishant is under substantial pressure so as to be in liquid form;
maintaining the extinguishant from the second container in wholly liquid form in a discharge bleed and metering line and nozzles, and avoiding significant pressure loss, preventing freeze-up and providing controlled rate flow accuracy maintenance in the line and nozzles, and providing violent boil-off when discharged from the nozzles to provide a thorough and rapid mix of the gas within the compartment; and
releasing and spreading the liquid near the ceiling from the second container at a predetermined rate at least equal to the amount lost through compartment leakage to ensure a predetermined average gas extinguishant concentration for a predetermined time in the compartment to adequately control or extinguish a fire in the compartment.

20. A method according to claim 19 including:
releasing the liquid from the second container through the bleed line having a pressure regulator therein to regulate the flow of pressure and temperature in the bleed line;
spreading the liquid from the bleed line through spaced regulated flow nozzles.

21. A method according to claim 20 in which:
the nozzles are series flow devices having relatively large flow passages allowing high pressure losses to minimize any possibility of plugging by fluid impurities during discharge.

22. A method according to claim 20 including:
opening the second container into the bleed line by igniting a squib to break a seal between the container and line.

23. A method according to claim 19 including:
establishing the gas extinguishant concentration for the initial flame knockdown at about 5% by volume of the compartment.

24. A method according to claim 20 in which:
the predetermined gas extinguishant concentration from the second container is about 3% by volume of the compartment.

25. A method according to claim 20 including:
insulating the bleed line between the regulator and the spaced nozzles to aid in ensuring stability of liquid phase flow of the extinguishant to the nozzles.

26. A method according to claim 25 including:

flowing the extinguishant through the nozzles at a rate in the range of 0.6 to 0.7 lbs./min.

27. A method according to claim 26 including:

superpressurizing the extinguishant in both containers with nitrogen to about 360 P.S.I.A. at 70° F.

28. A method according to claim 27 in which:

the extinguishant in the containers is liquid bromotrifluoromethane.

29. A method according to claim 22 including:

flowing the liquid extinguishant through the bleed line, between the second container and the regulator, through a molecular sieve filter/dryer to trap particles introduced in the bleed line during the squib ignition and to adsorb water in the extinguishant.

30. A method according to claim 26 in which:

the bleed line has a diameter of about 0.25".

* * * * *

UNITED STATES PATENT AND TRADEMARK OFFICE
CERTIFICATE OF CORRECTION

PATENT NO. : 4,643,260

DATED : February 17, 1987

INVENTOR(S) : Ralph G. Miller

It is certified that error appears in the above-identified patent and that said Letters Patent are hereby corrected as shown below:

Column 2, line 57, "spreding" should be -- spreading --.

Column 3, line 45, "samll" should be -- small --.

Claim 12, column 9, line 40, after "the gas", insert:

-- nozzles to provide for a thorough and rapid mix of the gas --.

Claim 12, column 9, line 42, "prdetermined" should be -- predetermined --.

Signed and Sealed this

Eleventh Day of August, 1987

*Attest:*

DONALD J. QUIGG

*Attesting Officer*

*Commissioner of Patents and Trademarks*